June 22, 1954 G. P. KILLIAN ET AL 2,681,495
PIPE JOINT MOLD
Filed Sept. 10, 1952 2 Sheets-Sheet 1

INVENTORS
George P. Killian and
James A. Killian
BY Mason, Fenwick & Lawrence
ATTORNEYS June 22, 1954 — G. P. KILLIAN ET AL — 2,681,495
PIPE JOINT MOLD
Filed Sept. 10, 1952 — 2 Sheets-Sheet 2

INVENTORS
George P. Killian and
James A. Kilian
BY Mason, Fenwick & Lawrence
ATTORNEYS Patented June 22, 1954

2,681,495

UNITED STATES PATENT OFFICE 2,681,495

PIPE JOINT MOLD

George P. Killian, Alexandria, Va., and James A. Kilian, Bethesda, Md., assignors to Better Boxes, Inc., Washington, D. C., a corporation of Delaware Application September 10, 1952, Serial No. 308,812

9 Claims. (Cl. 25—127)

The present invention relates in general to molds for the application of corrosion-resistant coating materials to pipe joints, couplings and the like. More particularly, the present invention relates to collapsible mold troughs to be assembled about field joint couplings of gas main sections, to facilitate molding of corrosion-resistant coatings about the field joint.

The invention is particularly designed for use in connection with pipe lines or mains for distributing city gas, and will be described in connection with such specific application. It is to be understood, however, that the invention is suitable for use in connection with pipe systems generally, such as for forming lead coated joints in plumbing systems and the like.

A particularly troublesome problem incident to the maintenance of pipe and conduit systems for city gas is that of corrosion control or mitigation. Pipe lines and pipe systems for conveying fuel in a gaseous state require special coupling procedures in constructing the field joints for intercoupling the various pipe sections of the system, to prevent the escape of gas from the field joints. Since these gas pipe lines are usually laid in the soil, special measures must be taken to corrosion.

It is preferable in constructing such gas pipe lines to form the coupled sections thereof of steel pipe. Steel pipe, however, intensifies the corrosion problem as contact of certain soils with the surface of the steel pipes sets up galvanic action which releases steel ions from the pipe. This release of steel ions is exhibited as corrosion. In order to avoid the corrosive effect of soil on the steel surface, the pipe must be coated continuously throughout its length to insulate the surface from contact with the soil. Steel pipe sections employed in such pipe line are now supplied by commercial sources with a layer of coating material extended continuously along the pipe section to a point adjacent each end of the pipe section. These coatings are usually formed of hot coating enamel made out of pitch, asphalt or other bituminous products.

When such commercially available steel pipe sections are assembled to form a pipe line, the coupling elements between the respective pipe sections and the area of the pipe immediately adjacent the field joint are in an uncoated state, and must be completely coated with corrosion-resistant material after the coupling has been assembled in position in the pipe line. It has been the conventional practice heretofore, to form this coating in a manner completely surrounding the coupling joint, by wrapping sheet material about the coupling elements and joint and extending beyond the ends of the preformed coating on the commercially supplied pipe sections, defining an enclosed area into which molten material may be poured about the joint. The sheet material forming the wrapping is bound at each end to the surface of the joint pipe sections and openings are left in the upper portion of the wrappings through which the molten coating material can be poured.

This method of coating field joints is attended by many practical difficulties and disadvantages. Skilled labor must be employed for wrapping the joints, as the process of wrapping the joint and pouring the molten material must be done with precision and two or three laborers are usually required to accomplish the several simultaneous operations. The area of the field joint coupling must be very carefully and precisely wrapped to insure that the poured coating extends over the entire joint area and overlaps a portion of the end of the coating on each adjacent pipe section.

Further, this method of coating pipe or field joints does not insure adequate protection of the bottom portion of the pipe. As the pipe and field joint usually rests in a trench and the sheet material wrapping extends in the form of a sling extending underneath the pipe, it is extremely difficult to prevent the wrapping from being pressed against the bottom of the pipe joint, resulting in uncoated or inadequately coated areas along the bottom portions of the pipe joint, which are unprotected from corrosion.

An object of the present invention, therefore, is the provision of a novel collapsible mold for applying corrosion-resistant coating materials to pipe joints and the like which obviates the disadvantages incident to the above described methods of coating pipe joints.

Another object of the present invention is the provision of a novel mold to be applied to field pipe joints and couplings in gas conduit systems, which are adapted to receive and mold corrosion-resistant coating about the pipe joint continuously over the uncoated areas of the pipe and joint.

Another object of the present invention is the provision of a collapsible mold for coating pipe joints and couplings with molten corrosion-resistant material, which may be readily assembled into an efficient mold without the use of skilled labor.

Another object of the present invention is the provision of a novel mold trough for forming corrosion-resistant coatings about pipe joints, which is collapsible in character and can be stored in flat form.

Another object of the present invention is the provision of novel mold troughs for forming corrosion-resistant coatings about pipe joints, which may be readily assembled from a flat blank of sheet material, and which when assembled insures that proper thicknesses of corrosion-resistant coating will be formed about the pipe joint.

Other objects, advantages and capabilities of the present invention will become apparent from the following detail description, taken in conjunction with the accompanying drawings, wherein only a preferred embodiment of the invention is shown.

Figure 1:
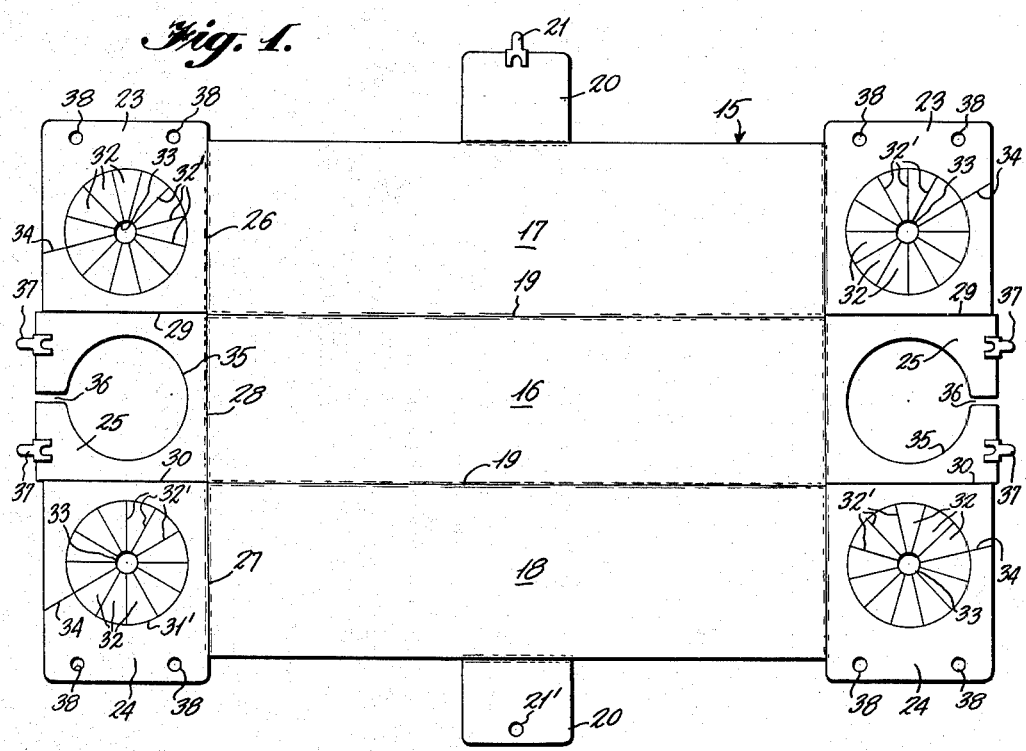
Figure 1 is a plan view of a blank of sheet material arranged to be formed into a mold trough embodying the present invention.

The present invention is concerned with a mold trough for forming coatings of corrosion-resistant coating materials about field joint couplings between gas main pipe sections, which trough is formed by folding a blank of cardboard or other sheet material into an upwardly opening rectangular receptacle, the walls of which are properly positioned relative to the components of the field joint coupling to insure a proper depth of coating material by the particular arrangement of the parts of the trough. This mold trough employs a novel arrangement of parts forming the end walls thereof affording a strong end wall which may be conveniently applied around the previously laid pipe sections, and which is provided with a novel arrangement for preventing seepage of the fluid coating material poured into the trough through trough apertures accommodating the pipe sections.

The invention will be more clearly understood from the following detail description had in conjunction with the drawings, wherein like reference characters designate corresponding parts throughout the several figures. Referring to the perspective view in Figure 2, the present invention is designed to form an upwardly opening rectangular mold trough, indicated generally by the reference character 10, which is to be applied about a field joint such as indicated by the reference character 11 for coupling the ends of adjacent pipe sections forming a gas main. In the embodiment illustrated in Figure 2, there is shown a pair of adjacent pipe sections 12 joined at their ends by a coupling of the type known in the trades as a dresser coupling, indicated by reference character 13, which generally comprises a plurality of flanged clamping plates embracing flanged ends of the pipe sections and secured together by longitudinal bolts.

The steel pipe sections 12 of the type commonly used in the trade for such gas mains, are provided with pre-formed coatings of corrosion-resistant compositions which extend substantially the length of the pipe sections and terminate, as indicated by reference character 14, at a point near each end of the pipe section, leaving exposed steel pipe surfaces 14' at the ends of the pipe sections. The function of the mold trough 10 is to form a receptacle by which a continuous coating of corrosion-resistant material can be molded about the dresser coupling 13 and exposed steel pipe surface 14' to form an uninterrupted extension of the pre-formed coatings on the pipe section and thoroughly encase all portions of the pipe line to resist corrosion.

The mold trough 10 of the present invention is formed from a flat blank 15 of cardboard or the like, so that the mold troughs can be cheaply produced and stored and supplied in flat condition, occupying a minimum of space. The cardboard blank 15 is generally rectangular in shape, and comprises a central bottom panel 16 of rectangular shape, bounded by rectangular side wall panels 17 and 18 hingedly connected to the central bottom panel 16 by rectilinear scores 19. The side wall panels 17 and 18 are adapted to be folded into upright position at right angles to the bottom panel 16 and to be secured in this position. To this end, the side wall panels 17 and 18 are provided with securing tabs 20 disposed substantially midway of the length thereof, the ends of the securing tabs 20 being adapted to slightly overlap each other when the side wall panels 17 and 18 are in upright parallel condition. One of the tabs 20 is provided with a metal fastener tongue 21 adapted to be projected through an accommodating aperture 21' in the other securing tab 20 and folded upon itself to secure the side wall panels in upright position.

The end walls of the trough 10, generally indicated by the reference character 22, are of a novel construction designed to produce a strong end wall which can be conveniently extended around the pipe sections 12 but resist seepage of the molten coated material. Each of the end walls 22 is formed of an inner end wall flap 23, and intermedial end wall flap 24, and an outer end wall flap 25, adapted to be disposed in overlying relation to form an end wall of three thicknesses of the cardboard sheet material. The end wall flaps 23, 24 and 25 are hingedly connected by scores 26, 27, 28 to the side wall panels 17 and 18 and bottom panel 16, respectively, the score lines 26 and 27 occurring along a side of the end wall flaps 23 and 24 when in erected position and the score line 28 being disposed at the bottom of the end wall flap 25 when in erected position. The end wall flaps 23, 24 and 25 are separated from each other by cuts 29 and 30 occurring at each side of the end wall flap 25 and constituting in effect continuations of the score lines 19 bounding the central bottom panel 16.

The inner and intermediate end wall flaps 23 and 24 are each provided with circular pipe-accommodating apertures 31 defined by circular score lines 31' and orange peel sectors 32 extending from the circular score lines 31' to a central opening 33. The radial cuts 32' forming the orange peel sectors 32 are alternately spaced on the intermediate end wall flap 24 relative to the corresponding cuts on the inner flaps 23, so that when the flaps 23, 24 are in overlying position, the orange peel sectors of the intermediate end wall flap 24 cover the cuts 32' defining the orange peel sectors of the inner end wall flap 23.

Each of the end wall flaps 23, 24 are provided with inclined slits 34 extending from the central opening 33 of the pipe-accommodating aperture 31 to the free side of the flaps 23, 24, so that the flaps may be extended around the cylindrical pipe section to dispose the pipe accommodating aperture 31 in position about the pipe section 12. The inclined slit 34 of the end wall flaps 23 and 24 extend from the central openings 33 in opposite directions when the end wall flaps 23 and 24 are in erected overlapping positions, to avoid weakening of the trough end wall.

The outer end wall flap 25 forms in effect a retaining ring for the intermediate and inner end walls 24 and 23, and to this end is provided with a circular opening 35 of the same diameter as the circular score line 31' of the end wall flaps 23 and 24, and a slot 36 extending from the circular opening 35 to the edge of the outer end wall flap 25 disposed opposite the score line 28, to permit the halves of the end flap 25 defined by the slot 36 to spread around the cylindrical pipe section 12 and dispose the circular opening 35 around the pipe section. Metal fastener tongues 37 are provided in the free end of the outer end wall flap 25, adapted to be projected through registering apertures 38 in the portions of the intermediate and inner end wall flaps 24 and 23 projecting above the end wall flap 25, the ends of the tongues 37 to be bent over to fasten the three overlying end wall flaps in position surrounding the pipe section 12.

In applying the trough 10 to a field joint 11, the flat cardboard blank 15 is slid underneath the bottom of the pipe sections 12 and coupling 13 forming the field joint, and positioned so that the longitudinal medial axis of the central bottom panel 16 lies in substantially the same vertical plane as the axis of the pipe line. The side panels 17 and 18 are then folded upwardly along the score lines 19 into an upright position, the upper securing tabs 20 are folded inwardly until their ends overlap, and the tongue of the metal fasteners 21 are then bent through the accommodating apertures 21 in the opposite tab to hold the side wall panels in erect position.

Figure 2:
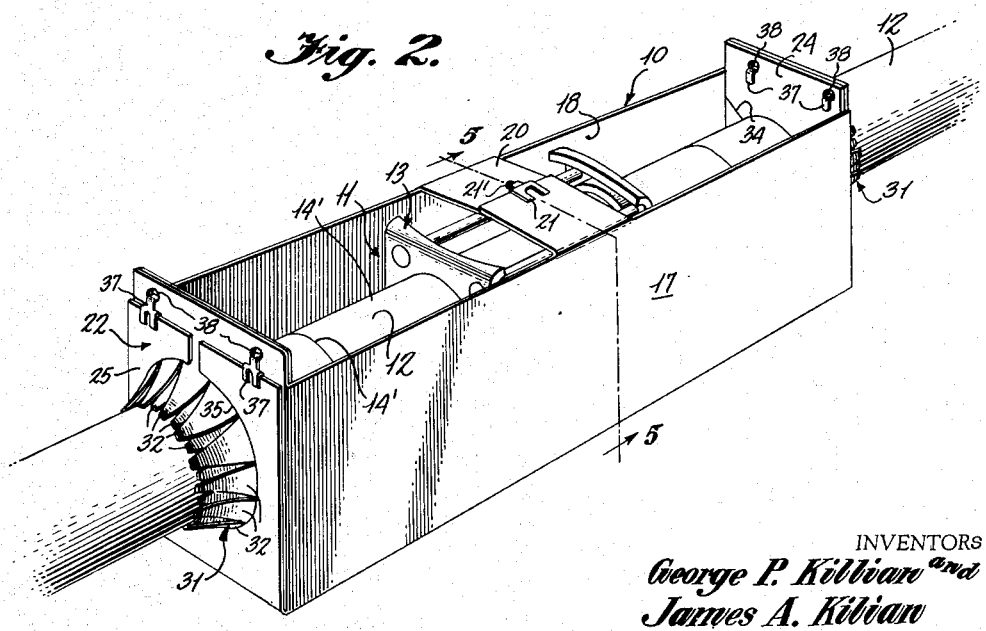
Figure 2 is a perspective view of a mold trough assembled from the blank of sheet material shown in Figure 1, illustrated in position of a typical field joint.
Figure 3:
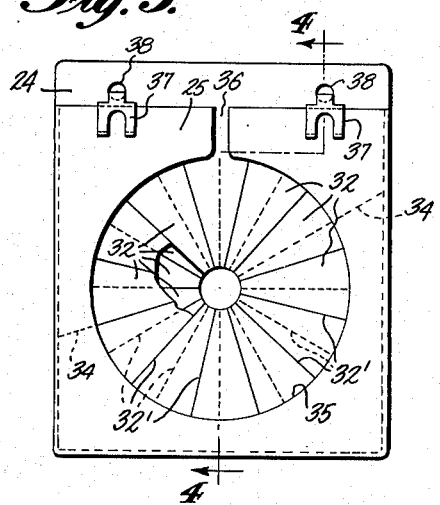
Figure 3 is an end elevation of the assembled mold trough embodying the present invention.
Figure 4:
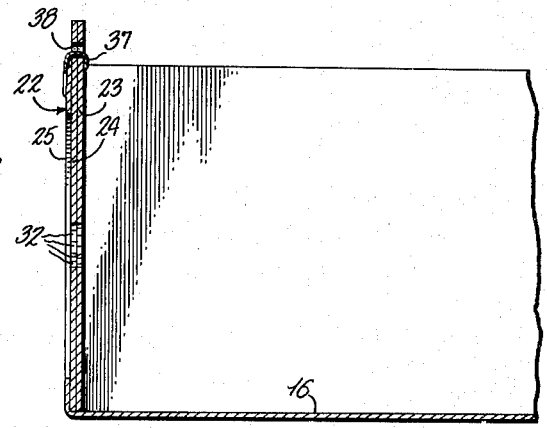
Figure 4 is a vertical longitudinal section of a portion of the assembled mold trough embodying the present invention, illustrating specifically the manner in which the end of the mold trough is formed.
Figure 5:
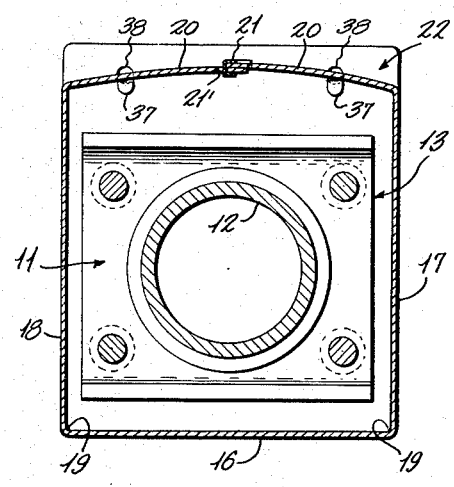
Figure 5 is a vertical transverse section of the collapsible mold trough illustrated in assembled position on a pipe line, taken along the lines 5—5 of Figure 2.

The inner end wall flap 23 and intermediate end wall flap 24 are then successively pivoted inwardly along the score lines 26 and 27, the halves of each of the flaps 23 and 24 defined by the inclined slit 34 therein being spread to permit the pipe section 12 to be received in the accommodating apertures defined by the circular score lines 31' and orange peel sectors 32. The orange peel sectors 32 are urged outwardly away from the center of the mold trough, to overlie the surface of the pipe section 12, as illustrated in Figure 2, the orange peel sectors of the intermediate end wall flap 34 overlying the radial cuts 32' forming the orange peel sectors of the inner end wall flap 23 to resist seepage of the molten coating material therethrough.

The outer end wall flap 25 forming the retaining ring for the pipe accommodating apertures 31 of the intermediate and inner flaps 24 and 23 is then folded upwardly along its score line 28, the halves of the flap 25 defined by the slot 36 being spread to permit the pipe section 12 and the orange peel sectors 32 of the flaps 24 and 23 to be received in the circular opening 35. The tongues of the metal fasteners 37 on the outer flap 25 are then bent through the registering apertures 38 of the intermediate and inner flaps 24 and 23 and bent downwardly to secure the overlying flaps 25, 24 and 23 in position. It may be desirable to tie a string around the outwardly projecting orange peel sectors of the end flaps 24 and 23 to give further security against seepage of molten coating material through the pipe accommodating apertures 31.

This molding trough, coupled to the pipe sections 12 and about the field joint 11 in the manner just described, is then in proper form for the molten coating material, such as hot pipe coating enamel formed from pitch, asphalt or other bituminous products, to be poured into the mold trough, to form a continuous body of coating material about the exposed steel pipe surfaces 14' and dresser coupling 13 to thoroughly encase the exposed sections and prevent corrosive action through contact of soil therewith. The provision of pipe accommodating apertures in the end walls and the dimensions of the end walls and side and bottom panels insure that the molding surfaces of the trough are disposed at proper distances from the pipe and coupling to provide proper thickness of coating material at all points. The molten coating material is preferably of the same or similar composition as the pre-formed coating on the pipe sections 12, so that a continuous homogeneous coating about the pipe and field joint results.

It will be apparent that the present device makes possible a substantial saving in labor costs previously involved in laying out pipe lines for city gas and the like, as it makes available a simple and inexpensive mold which can be stored and shipped in flat, stacked condition, which is constructed from inexpensive expendable materials, which is sufficiently simple to be assembled by unskilled labor, and which is so designed relative to the dimensions of the joint parts to insure proper thickness of coating over all exposed parts of the pipe joint.

While but one specific embodiment of the invention has been particularly shown and described, it is apparent that various modifications may be made in the invention without departing from the spirit and scope thereof, and it is desired therefore, that only such limitations shall be placed thereon as are imposed by the prior art and set forth in the appended claims.

What is claimed is:

1. An upwardly opening mold trough folded from a blank of sheet material and having a bottom and opposing side and end walls to be fitted in spaced relation about a pipe field joint for molding corrosion-resistant coatings thereon, each of said end walls comprising a plurality of overlying end wall flaps integral with and folded into overlying relation from said bottom and side walls, at least one of said end wall flaps having pipe-receiving openings therein formed of scores of substantially the cross section of pipe joined by said field joint and hinged tabs radiating inwardly from said scores to be bent outwardly of said trough to overlie the surface of said pipe, and another of said overlying end wall flaps having an aperture therein to receive said pipe and projecting tabs therethrough and form a retaining ring therefor.

2. An upwardly opening mold trough folded from a blank of sheet material and having a bottom and opposing side and end walls to be fitted in spaced relation about a pipe field joint for molding corrosion-resistant coatings thereon, each of said end walls comprising three overlying end wall flaps integral with and folded into overlying relation from said bottom and side walls, the two innermost of said end wall flaps having pipe-receiving openings therein formed of scores of substantially the cross section of pipe joined by said field joint and hinged tabs radiating inwardly from said scores to be bent outwardly of said trough to overlie the surface of said pipe, and the outermost one of said overlying end wall flaps having an aperture therein to receive said pipe and projecting tabs therethrough and form a retaining ring therefor.

3. An upwardly opening mold trough folded from a blank of sheet material and having a bottom and opposing side and end walls to be fitted in spaced relation about a pipe field joint for molding corrosion-resistant coatings thereon, each of said end walls comprising three overlying end wall flaps integral with and folded into overlying relation from said bottom and side walls, the two innermost of said end wall flaps having pipe-receiving openings therein formed of scores of substantially the cross section of pipe joined by said field joint and hinged orange peel sectors integral with said flaps and radiating inwardly from said scores to be bent outwardly of said trough to overlie and be bound to the surface of said pipe, and the outermost one of said overlying end wall flaps having an aperture therein to receive said pipe and orange peel sectors therethrough and form a retaining ring therefor.

4. In a mold trough, the combination claimed in claim 3 wherein said orange peel sectors are formed by inwardly radiating cuts extending from said opening-forming scores and the radial cuts in said two innermost end wall flaps are positioned in staggered relation so that the sectors of the outermost of said innermost flaps overlie the radial cuts of the innermost flap.

5. An upwardly opening mold trough folded from a blank of cardboard sheet material and having a bottom and opposing side and end walls to be fitted in spaced relation about a pipe field joint for molding corrosion-resistant coatings thereon, each of said end walls comprising a first end wall flap folded inwardly from one of said side wall panels, a second end wall flap folded inwardly from the opposing side wall panel into overlying relation with said first end wall panel, said first and second end walls having pipe receiving openings comprising aligned scored apertures bounded by hinged projecting fingers radiating inwardly from said scores to be disposed along the surface of said pipe sections, and a third end wall flap hingedly connected to said bottom and folded upwardly therefrom to overlie said first and second end wall flaps having a circular aperture therein accommodating said pipe section and outwardly projecting triangular elements to form a retaining ring therefor.

6. An upwardly opening mold trough folded from a blank of cardboard sheet material and having a bottom and opposing side and end walls to be fitted in spaced relation about a pipe field joint for molding corrosion-resistant coatings thereon, each of said end walls comprising an inner end wall flap hingedly connected along one side thereof to one of said side wall panels, an intermediate end wall flap hingedly connected along one side thereof to the opposing side wall panel and folded into overlying relation with said inner end wall panel, said end walls having pipe receiving openings comprising aligned scored apertures bounded by hinged projecting fingers radiating inwardly from said scores to be disposed along the surface of said pipe sections, and an outer end wall flap hingedly connected to said bottom and folded upwardly therefrom to overlie said inner and intermediate end wall flaps having a circular aperture therein accommodating said pipe section and outwardly projecting triangular elements to form a retaining ring therefor.

7. In a mold trough for forming corrosion-resistant coatings about pipe field joints, the combination recited in claim 6 wherein said projecting fingers are formed by cuts radiating inwardly from said scores and the cuts of said inner and intermediate flaps are staggered whereby the fingers of said intermediate flap overlie the radiating cuts of said inner flap.

8. A mold trough formed from a blank of cardboard sheet material and adapted to be fitted about field pipe joints for forming molded envelopes of corrosion-resistant material about the pipe joints, comprising a bottom panel, a pair of side wall panels hingedly connected to said bottom panel along opposite sides thereof by score lines, securing tabs hingedly connected by score lines to each of said side wall panels to be secured together to hold said side wall panels in erect position, and an end wall assembly disposed in upright relation to the bottom panel at each end thereof comprising an inner pair of overlying end wall flaps each hingedly connected along one side thereof to said side wall panels and disposed in overlying relation to each other, each of said end wall flaps having axially aligned pipe receiving openings centrally disposed therein each comprising a circular score of substantially the diameter of the pipe and inwardly radiating triangular sectors defined by radial cuts extending from said circular score to be projected out into overlying relation over the surface of the pipe to be bound thereto, and an outer end wall flap hingedly connected along its bottom to the end of said bottom panel and folded in erect position overlying said end wall flaps, said outer flap having a circular aperture therein to fit around the pipe and triangular sectors and form a retaining ring therefor, said inner pair of end wall flaps and said outer end wall flap each having slits therein extending from the opening therein to a free edge thereof to permit said flaps to be spread about the pipe section and seat the pipe section in said openings.

9. In a mold trough formed from a blank of cardboard, the combination recited in claim 8 wherein the radial cuts forming said triangular sectors of said inner pair of flaps are in staggered relation disposing the triangular sectors of one of said flaps in overlying relation to the radial cuts of the other of said flaps.

References Cited in the file of this patent

UNITED STATES PATENTS

| Number | Name | Date |
| --- | --- | --- |
| 956,409 | Pendleton | Apr. 26, 1910 |
| 1,861,206 | Burgess | May 31, 1932 |
| 1,865,268 | Morris | June 28, 1932 |
| 1,892,983 | Holmer | Jan. 3, 1933 |
| 2,042,446 | Ferguson | May 26, 1936 |
| 2,238,545 | Whiley | Apr. 15, 1941 |
| 2,334,930 | Huddle | Nov. 23, 1943 |
| 2,544,283 | Snyder | Mar. 6, 1951 |